United States Patent
Montaner Fraguet et al.

(10) Patent No.: US 11,976,432 B2
(45) Date of Patent: May 7, 2024

(54) FOUNDATION FOR WIND TURBINE TOWERS

(71) Applicant: HWS CONCRETE TOWERS, S.L., San Sebastian (ES)

(72) Inventors: Jesus Montaner Fraguet, San Sebastian (ES); Jose Manuel Sorazu Echave, San Sebastian (ES); Mariano Abadia Perez, San Sebastian (ES)

(73) Assignee: HWS CONCRETE TOWERS, S.L., San Sebastian (ES)

(*) Notice: Subject to any disclaimer, the term of this patent is extended or adjusted under 35 U.S.C. 154(b) by 440 days.

(21) Appl. No.: 17/297,818

(22) PCT Filed: Nov. 20, 2019

(86) PCT No.: PCT/ES2019/070791
§ 371 (c)(1),
(2) Date: May 27, 2021

(87) PCT Pub. No.: WO2020/115341
PCT Pub. Date: Jun. 11, 2020

(65) Prior Publication Data
US 2021/0395970 A1   Dec. 23, 2021

(30) Foreign Application Priority Data
Dec. 3, 2018   (ES) ................ ES201831175

(51) Int. Cl.
*E02D 27/42*   (2006.01)
*E04H 12/08*   (2006.01)
(Continued)

(52) U.S. Cl.
CPC ........... *E02D 27/425* (2013.01); *F03D 13/22* (2016.05); *E02D 2250/0023* (2013.01);
(Continued)

(58) Field of Classification Search
CPC ......... E02D 27/425; E02D 2250/0023; E02D 2300/002; F03D 13/22; E04H 12/08; E04H 12/12; E04H 12/16
See application file for complete search history.

(56) References Cited

U.S. PATENT DOCUMENTS 2,446,949 A * 8/1948 Neutra ............... E04H 9/021
279/158
4,077,174 A * 3/1978 DE Leaumont ........ E04H 12/12
52/438
(Continued)

FOREIGN PATENT DOCUMENTS

CN    206845396 U    1/2018
ES    2347742 A1     11/2010
(Continued)

OTHER PUBLICATIONS

International Search Report for corresponding PCT application No. PCT/ES2019/070791, mailed Apr. 17, 2020.

*Primary Examiner* — Gisele D Ford
(74) *Attorney, Agent, or Firm* — Notaro, Michalos & Zaccaria P.C.

(57) ABSTRACT

A foundation for wind turbine towers of the type used to support both metal towers and concrete towers of wind turbines that uses precast concrete or metal beams, combined with small footings concreted in situ, the beams being structurally connected at the central part of the foundation by the elements of connection and of support of the tower is disclosed. The invention affords the main advantage of achieving a notable reduction in the volume of materials used, both concrete and rebar, with a great reduction in assembly time and the consequent great economic savings as well as its ease of adaptation to different terrains is presented.

11 Claims, 6 Drawing Sheets

(51) Int. Cl.
*E04H 12/12* (2006.01)
*E04H 12/16* (2006.01)
*F03D 13/20* (2016.01)

(52) U.S. Cl.
CPC ........ *E02D 2300/002* (2013.01); *E04H 12/08* (2013.01); *E04H 12/12* (2013.01); *E04H 12/16* (2013.01)

(56) References Cited

U.S. PATENT DOCUMENTS

| | | | | |
|---|---|---|---|---|
| 6,390,435 | B1* | 5/2002 | Gustafsson | E04H 12/20 343/882 |
| 6,464,196 | B1* | 10/2002 | Crookham | E04H 12/10 248/519 |
| 6,572,061 | B2* | 6/2003 | Overbeck | A47C 7/008 248/163.1 |
| 9,096,985 | B1* | 8/2015 | Phuly | E04H 12/341 |
| 9,938,685 | B2* | 4/2018 | Krause | E04B 1/215 |
| 2006/0165493 | A1* | 7/2006 | Nim | F03D 13/22 405/223.1 |
| 2012/0068039 | A1* | 3/2012 | Erich | E04H 12/2238 248/519 |
| 2012/0228442 | A1* | 9/2012 | Clifton | F24S 25/10 248/163.1 |
| 2013/0139453 | A1* | 6/2013 | Jolly | E02D 27/425 52/173.1 |
| 2014/0115978 | A1 | 5/2014 | Fairbairn | |
| 2014/0290161 | A1* | 10/2014 | Zavitz | E04H 12/342 52/223.14 |
| 2015/0159337 | A1* | 6/2015 | Kellner | F24S 25/617 248/156 |
| 2015/0159802 | A1* | 6/2015 | Johnson | F16M 11/22 248/165 |
| 2015/0240442 | A1* | 8/2015 | Garcia-Valdecasas Bernal | E02D 27/22 405/208 |
| 2015/0308140 | A1* | 10/2015 | Clifton | E02D 27/425 248/346.2 |
| 2015/0376857 | A1* | 12/2015 | Clifton | E04H 12/2269 52/292 |
| 2016/0075413 | A1* | 3/2016 | Nebrera Garcia | E02D 27/425 114/122 |
| 2016/0230365 | A1* | 8/2016 | Shi | E02D 27/42 |
| 2017/0030045 | A1 | 2/2017 | Krause et al. | |
| 2017/0183840 | A1* | 6/2017 | Tozer | E02D 27/425 |
| 2017/0244234 | A1* | 8/2017 | Behr | H02G 13/80 |
| 2018/0030963 | A1* | 2/2018 | Viselli | B63B 39/03 |
| 2018/0283032 | A1* | 10/2018 | Harmer | H01Q 1/1242 |
| 2019/0177995 | A1* | 6/2019 | Klause | E02D 27/425 |
| 2019/0226174 | A1* | 7/2019 | Schuldt | E02D 27/425 |
| 2019/0292804 | A1* | 9/2019 | Kensinger | E04B 1/34305 |
| 2020/0277936 | A1* | 9/2020 | Riemers | E02D 27/425 |
| 2021/0123202 | A1* | 4/2021 | Lebon | E02D 13/00 |
| 2021/0123204 | A1* | 4/2021 | Betz | E02D 27/42 |
| 2021/0222677 | A1* | 7/2021 | Stecher | F03D 13/22 |

FOREIGN PATENT DOCUMENTS

| | | |
|---|---|---|
| ES | 2524840 A1 | 12/2014 |
| ES | 2544806 T3 | 9/2015 |
| ES | 2571731 T3 | 5/2016 |
| ES | 2601232 T3 | 2/2017 |
| ES | 2659523 T3 | 3/2018 |
| ES | 2685834 T3 | 10/2018 |
| WO | 0046452 A1 | 8/2000 |
| WO | 2015185770 A1 | 12/2015 |
| WO | 2016116645 A1 | 7/2016 |
| WO | 2017039975 A1 | 3/2017 |

* cited by examiner

FOUNDATION FOR WIND TURBINE TOWERS

This description relates, as its title indicates, to a foundation for wind turbine towers, of the type used to support both metal towers and concrete towers of wind turbines, which uses precast concrete beams combined with small footings concreted in situ, the beams being structurally connected at the central part of the foundation by means of elements of connection and of support of the tower.

FIELD OF THE INVENTION

The invention relates to the field of foundations used as a support for both metal towers and concrete towers of wind turbines.

Current State of the Art

At present wind turbine towers are widely used, mainly for the generation of electrical energy. Due to their great height they need to be firmly anchored to the ground, which, in most installations is carried out by a mainly tapered foundation, made of reinforced concrete, as described in patents ES2659523 "*Method for erecting a wind turbine*", ES2685834 "*A wind turbine tower and method for altering the natural frequency of a wind turbine tower*" and ES2347742 "*Wind turbine foundation*". Patent ES2571731 "*Wind power plant foundation as well as wind power plant*" specifically includes the reinforcement used for a conventional foundation. This type of foundation has a large number of drawbacks, among which, is that it requires a deep prior excavation, of a diameter of more than 18 metres and a depth of at least 4 metres and it uses a great quantity of concrete, approximately 400 $m^3$ or more, as well as some 38,000 kg or more of large-section metal reinforcement or rebar. All of this involves a high economic cost and a lengthy construction time.

To circumvent these problems partially and use less concrete and rebar, in some cases a mainly cylindrical structure is implemented, with peripheral structural reinforcements in the form of radial ribs or braces, both concreted in situ. Examples of these structures can be seen in patents WO2016116645 "Concrete Tower", WO2015185770 "Foundation system for towers and method for installing the foundation system for towers" and ES2524840 "Foundation system for towers and method for installing the foundation system for towers".

In other cases, these lateral reinforcements are in the form of precast concrete braces or metal bars or elements, as seen in patents ES2544806 "Improved foundation for a wind turbine tower" or ES2601232 "Foundation for wind power plants".

However, these embodiments do not manage to remedy the main problems due to the large volume of foundation that has to be concreted in situ and the complexity and volume of the reinforcement, as previously mentioned. Apart from these problems it must be added that, for correct curing, concreting must be continuous, without interruptions, which requires a stable supply of a high volume of concrete that in many regions or countries is difficult or impossible to obtain. Neither is it easy, in many countries with poor economies, to obtain the large volume of rebar needed for the reinforcement.

Another additional problem is that to carry out the necessary excavation, ramps have to be made for the descent of heavy machinery, because of the need to excavate to a such a depth, which increases the work time. Likewise, the bottom of the excavation must be levelled and smoothed.

All of this means that the usual time for excavation, preparation, concreting and curing is around 3 or 4 weeks, which when multiplied by the large number of wind turbines on each wind farm, involves a very large economic cost.

A further drawback is that this type of foundation is difficult to adapt to heterogeneous terrains or deficient terrains and in most cases requires an even greater investment or precludes the installation of wind turbines on some terrains.

DESCRIPTION OF THE INVENTION

To solve the problems that currently exist with wind turbine foundations, the foundation for wind turbine towers that is the subject of the present invention has been envisaged, which combines at least three precast beams arranged horizontally in a radial manner, with small reinforced concrete footings, carried out in situ, that support the outermost ends of the beams by means of a support ball joint, either linear or spherical, that may or may not have limitations of displacement in one or more directions, in the central part of the said footing, that allows all the supported stress to be distributed equally through the footing. The ends are also secured by anchors between the end of the beam and the footing, to prevent the tower from overturning. The different beams are solidly secured together at the central part of the foundation by connection means. The precast beams can be made of concrete, metal or a combination of both.

The footings can adopt different shapes and depths, even in the same foundation, to adapt to the particular characteristics of each terrain.

Preferably, three precast beams will be used, one of which is approximately twice the length of the other two beams, the inner ends of the smaller beams being, in this case, solidly secured to the central part of the larger beam, forming a cross-shaped plan structure. This structure has proven to be the optimal one in terms of ease of manufacture, transport and performance. However, it is also possible to carry out the foundation that is the object of this invention alternatively with a plurality of beams of the same or different length, in a number equal to or greater than three, joined at their inner ends, and with each of their outer ends connected in the same way to a footing.

Two embodiment variations are described, one for the case when the wind turbine tower is metal and another for the case when the wind turbine tower is concrete, at least at its lower part, that is, that it is made totally of precast concrete, either in sections or in segments, or it combines a concrete, mainly lower part of the tower with a top part of the tower that is metal.

In the case that the wind turbine tower is metal, the means of solidly securing the beams also comprise a concrete ballast filling, located below ground level at the connection of the beams, over which there is an upper slab, emerging above ground level, for the anchoring of the metal tower.

In the case that the wind turbine tower is concrete, at least at its lower part, the means for solidly securing the beams also include a hollow tensioning chamber closure, carried out with precast concrete elements, with a circular sector or polygonal plan and wall on the outer side, placed between the inner sections of the beams, and an upper slab, with a circular crown plan, over the connection of the beams, for the support of the precast concrete tower and the anchoring of the vertical post-tensioning of the tower. In this case, the precast concrete tower is supported on the upper slab and the vertical post-tensioning of the said tower passes through the upper slab, through perforations or ducts to the hollow tensioning chamber, where the means to perform the post-tensioning and securing of the cables that provide rigidity to the tower are located.

Preferably, the beams are of rectangular section, with a greater height in the centre section and lesser height at the ends. The sections of greater height are normally oriented downward so that most of the foundation is buried below ground level, with only part of the upper slab emerging, minimising the visual impact. However, at sites where the visual impact is not as important and an additional small saving is desired, it is possible to assemble the beams with the sections of greater height oriented upward, emerging above ground level, together with part of the concrete ballast filling or the precast concrete elements, together with the entire upper slab This foundation for wind turbine towers disclosed, requires a specific construction method that includes a first phase of preparing the terrain, a second phase of concreting the footings, a third phase of the curing of the footings, a fourth phase of assembling the precast beams, a fifth phase of carrying out the connection of the beams at the central part, and a sixth phase of filling the remaining space to the original ground level.

Advantages of the Invention

The foundation for wind turbine towers presented affords numerous advantages over the techniques currently known and used, the most important being that, as small footings are used, it provides an enormous saving both on the quantity of concrete and the quantity of rebar for reinforcement that are used, which implies both a notable economic saving and the possibility of implementation in regions or countries with problems for the supply or production of concrete or rebar in such quantities.

As a result of the aforesaid, the problems associated with the need to supply a large quantity of concrete in a continuous, uninterrupted way, inherent to large conventional foundations, for correct curing, are eliminated. It also enables the use of conventional, preassembled rebar reinforcement without the need to assemble costly, specialised reinforcement in situ before concreting.

Another important advantage is that much less excavation is required, both in terms of volume and depth, there being no need to make ramps for heavy machines to descend down, as is normally the case for conventional foundations several metres deep. This results in notable savings in time and economic cost.

Another advantage of this invention is that, unlike conventional techniques, the bottom of the footings does not need to be perfectly levelled or smoothed, which also results in an additional saving in time and economic cost.

Another of the most important advantages to be highlighted is that, as precast elements are used, the overall construction time of the foundation is notably reduced, from the usual 3 or 4 weeks, using conventional techniques, to a maximum of 1 week.

Furthermore, another additional advantage is that this foundation can be easily adapted to different types of ground, both homogeneous terrains and heterogeneous or deficient terrains, making it possible to install wind turbine towers in areas where this was not possible with conventional foundations, without any reduction in capacity.

DESCRIPTION OF THE FIGURES

To gain a better understanding of this invention, the attached drawing shows a practical preferred embodiment of a foundation for wind turbine towers, with two embodiment variations, one for metal towers and another for towers that have at least their lower part made of concrete.

In the said drawing.

PREFERRED EMBODIMENT OF THE INVENTION

The conformation and characteristics of the invention can be better understood in the following description that relates to the attached figures.

Figure 1:
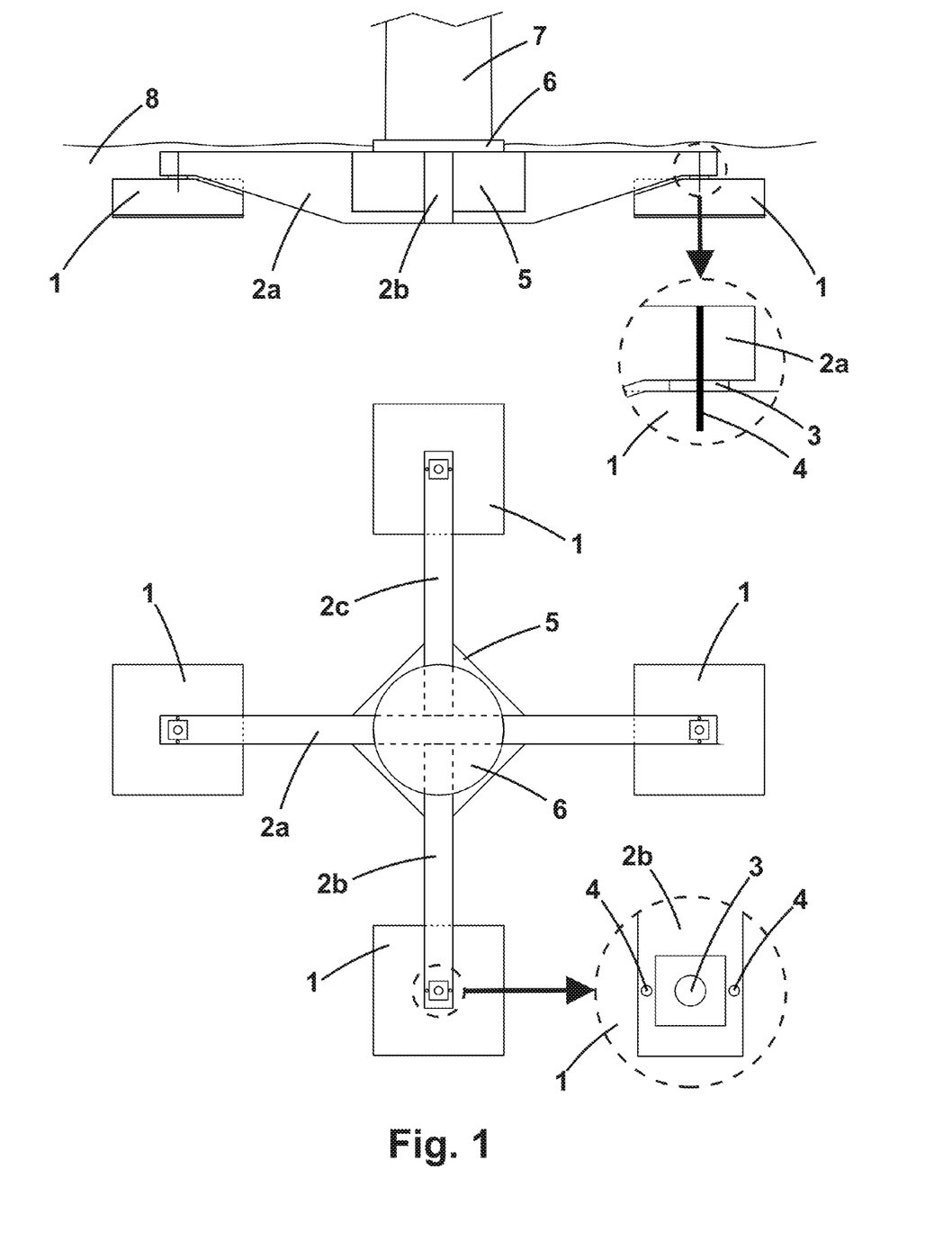
FIG. 1 shows sectional and plan views of a foundation for metal towers, with most of the foundation below ground level.
Figure 3:
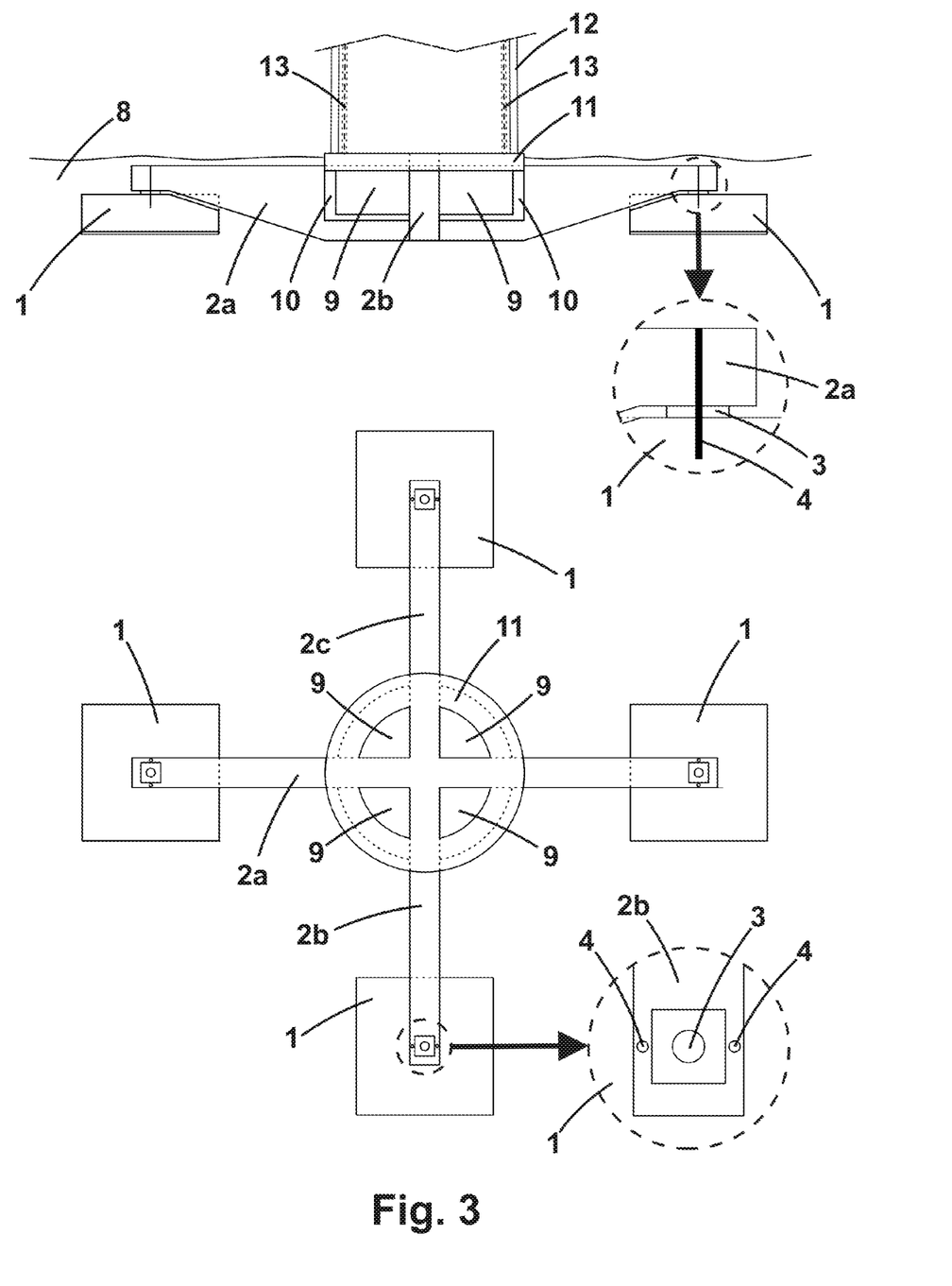
FIG. 3 shows sectional and plan views of a foundation for towers that are totally or partially concrete, with most of the foundation below ground level.

FIGS. 1 and 3 show examples of foundations for wind turbine towers that comprise at least three precast beams (2a, 2b, 2c) arranged horizontally in a radial manner, whose outermost end or ends are each supported on a concrete footing (1) by means of a support ball joint (3) in the central part of the said footing (1), and are also secured by means of a plurality of anchors (4) between the end of the beam (2a, 2b, 2c) and the footing (1), the different beams being solidly secured together at the central part of the foundation by connection means. The support ball joint (3) can be linear or spherical and may or may not have displacement limitations in one or more directions.

In the preferred embodiment shown in FIGS. 1 and 3, three beams are used, of which beam (2a) is approximately twice the length of beams (2b, 2c), the inner ends of beams (2b, 2c) being, in this case, solidly secured to the central part of the beam (2a), forming a cross-shaped plan structure. This structure has proven to be the optimal one in terms of ease of manufacture, transport and performance. However, it is also possible to carry out the foundation that is the object of this invention alternatively with a plurality of beams of the same or different length, in a number greater than three, joined at their inner ends, and with each of their outer ends connected in the same way to a footing (1).

The precast beams (2a, 2b, 2c) can be of concrete, metal or a combination of both. In all of the cases, the means for solidly securing the beams (2a, 2b, 2c) comprise the use of conventional techniques of connecting precast concrete elements, such as threaded rods, brackets, reinforcement ends for concreting in the housings of another beam, tongue-and-groove joints, post-tensioning strands, etc.

Figure 5:
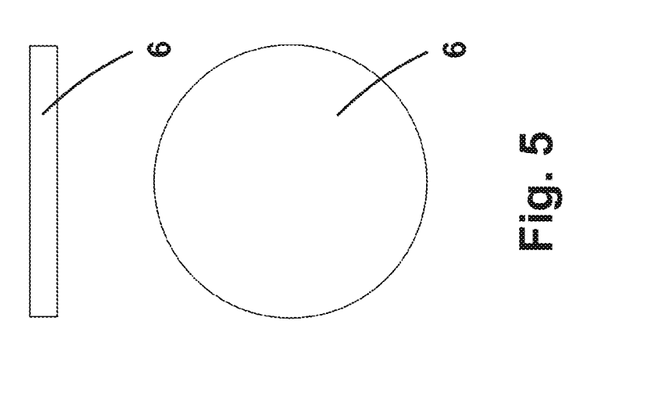
FIG. 5 shows elevation and plan views of the upper slab for the anchoring of a metal tower.

Two embodiment variations are described. The first of them refers to the case of the wind turbine tower being metal, as shown in FIGS. 1, 2 and 5, and, in this case, the means for solidly securing the beams (2a, 2b, 2c) comprise, moreover, a concrete ballast filling (5), located below ground (8) level at the connection of beams (2a, 2b, 2c), over which there is an upper slab (6) emerging above the ground (8), for the anchoring of the metal tower (7).

The concrete ballast filling (5) can be carried out either over traditional recoverable formwork made of wood, metal or a combination of both, or over formwork made of precast concrete elements.

FIG. 2 shows how the upper slab (6) for anchoring the metal tower (7) adopts a preferably circular plan, with the possibility of it also being polygonal, made preferably of reinforced concrete of at least HA-50 strength.

The anchoring of the metal tower (7) to the upper slab (2) is carried out using conventional techniques of anchoring to foundations, such as threaded rods with nuts, bolts, etc . . . .

The second embodiment variation refers to the case of the wind turbine tower being concrete, at least at its lower part, as shown in FIGS. 3, 4, 6 and 7, and, in this case, the means of solidly securing the beams (2a, 2b, 2c) comprise, moreover, precast concrete elements (10) placed between the inner ends of the beams (2a, 2b, 2c), defining a hollow tensioning chamber (9), and an upper slab (11), over the connection of the beams (2a, 2b, 2c) and over the tensioning chamber (9), for the support of the concrete tower (12) and anchoring of the vertical post-tensioning (13) of the tower.

Figure 6:
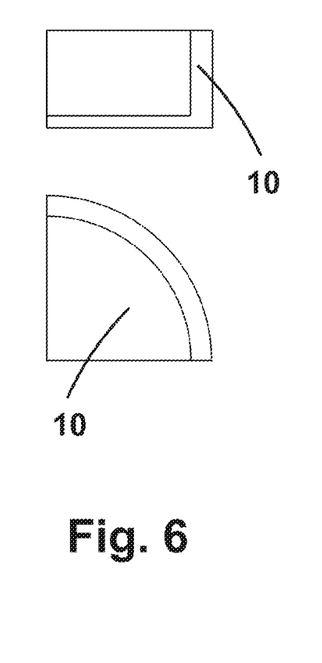
FIG. 6 shows elevation and plan views of a precast concrete element for closing the tensioning chamber for towers that are totally or partially concrete.

The precast concrete elements (10) adopt a plan chosen from the group formed by circular sector with an angle depending on the number of beams used, and polygonal, having a vertical wall solely on the side or sides not adjacent to the beams. FIG. 6 shows the precast concrete elements (10) with a circular sector plan, with an angle of 90° in the case shown, and a vertical wall solely at the curved end.

Figure 7:
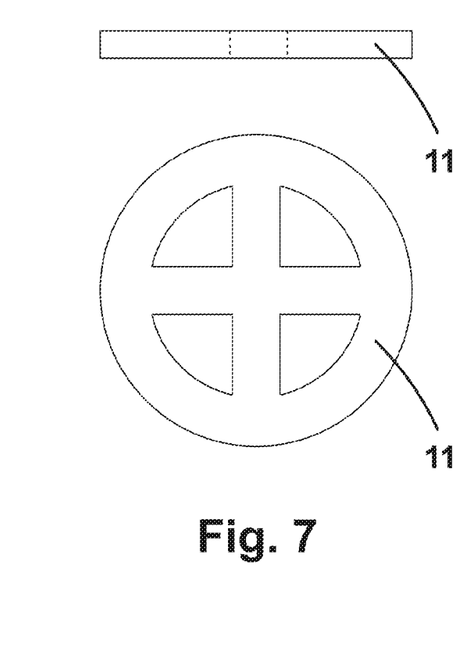
FIG. 7 shows elevation and plan views of the upper slab for the support of towers that are totally or partially concrete.

FIG. 7 shows how the upper slab (11) includes access openings to the tensioning chamber (9), being preferably made of prestressed concrete, of at least HP-50 strength.

The concrete tower (12) is supported on the upper slab (11), and the vertical post-tensioning (13) of the said tower passes through the upper slab (11), through the opportune perforations or ducts, to the hollow tensioning chamber (9), where the means are located to perform the post-tensioning and securing of the cables that provide rigidity to the tower, as is common practice in towers made of precast concrete sections or segments.

Figure 2A:
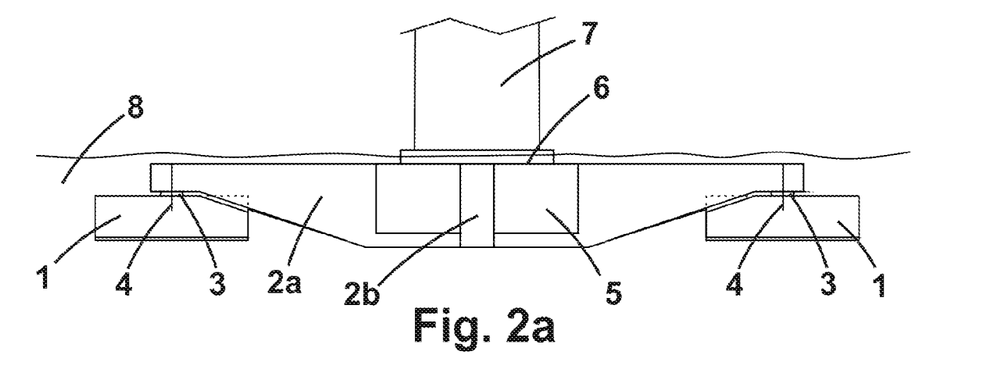
FIGS. 2a, 2b and 2c show sectional views of various variations of footings that are usable, depending on the type of ground, in a foundation for metal towers, with most of the foundation below ground level.
Figure 2B:
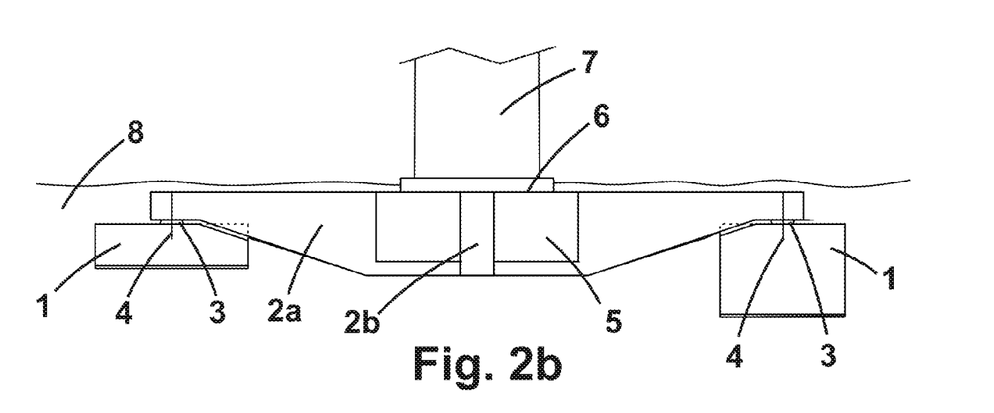
Figure 2C:
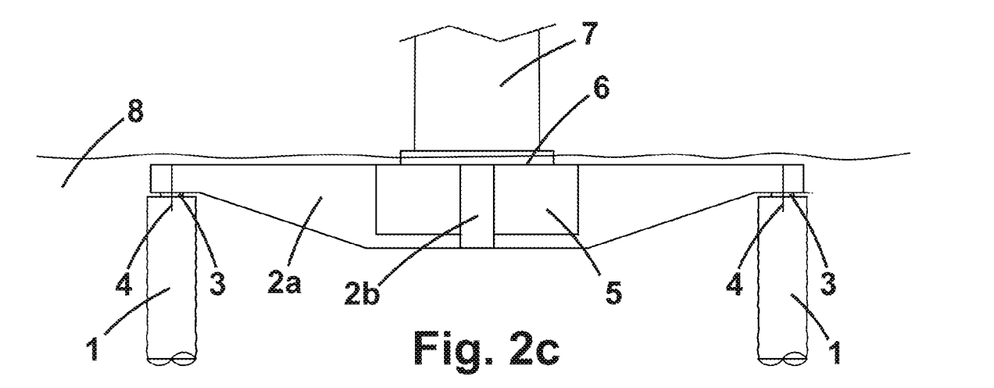
Figure 4A:
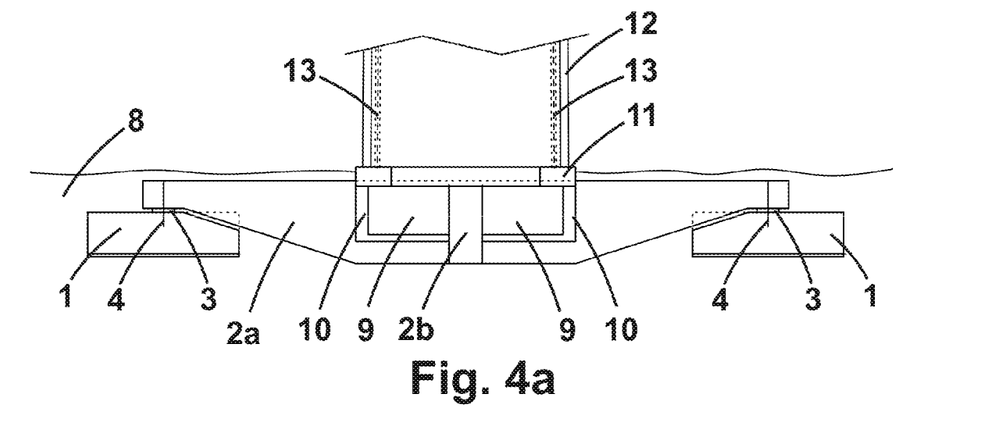
FIGS. 4a, 4b and 4c show sectional views of various variations of footings that are usable, depending on the type of ground, in a foundation for towers that are totally or partially concrete, with most of the foundation below ground level.
Figure 4B:
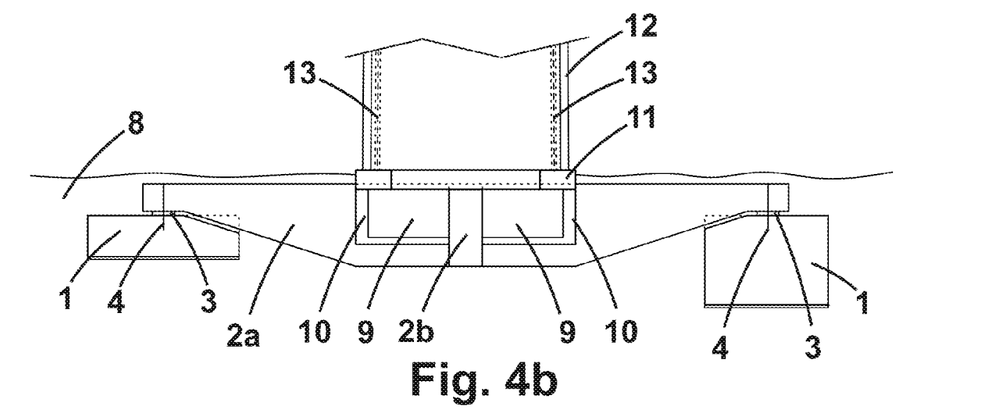
Figure 4C:
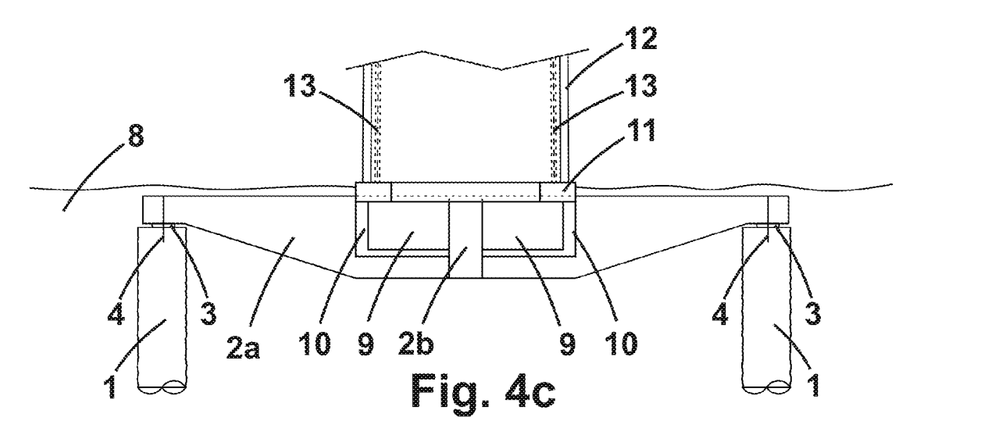

In both variations, as shown in FIGS. 2a, 2b, 2c, 4a, 4b and 4c, it is possible to adopt different configurations in terms of the shape, dimensions and depth of all or any of the footings, to adapt the foundation to the particularities of each of the terrains where the tower is to be installed. Thus, FIGS. 2a and 4a show footings at the same depth, corresponding to a homogeneous terrain. FIGS. 2b and 4b show footings at different depths, corresponding to a heterogeneous terrain or a terrain with differences in level. Finally, FIGS. 2c and 4c show deep pile foundation footings, for deficient terrains.

Figure 8:
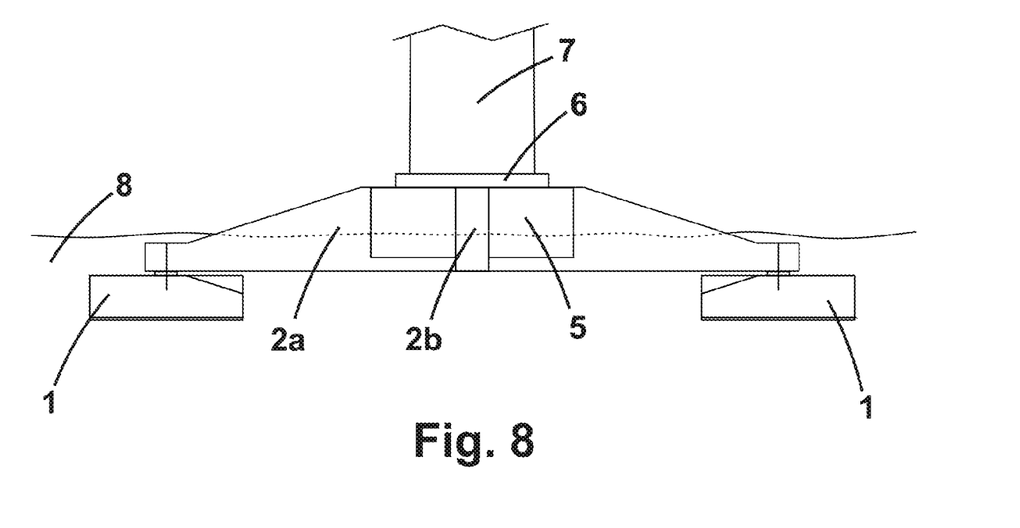
FIG. 8 shows a sectional view of a foundation for metal towers, with part of the foundation above ground level.
Figure 9:
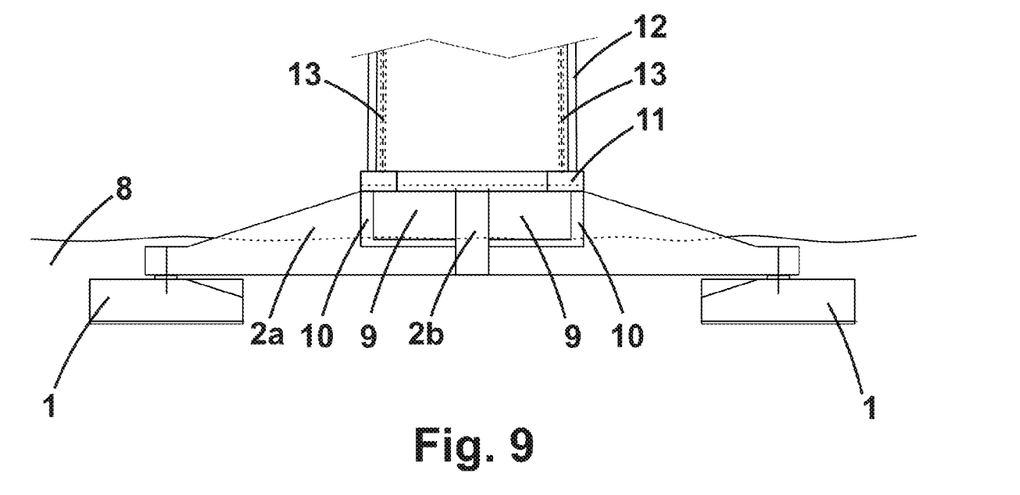
FIG. 9 shows a sectional view of a foundation for towers that are totally or partially concrete, with part of the foundation above ground level.

The beams (2a, 2b, 2c) will be preferably of rectangular section, with a greater height in the central section and lesser height at the ends. The sections of greater height will normally be oriented downward, as is shown in FIGS. 1, 2, 3 and 4, in such a way that most of the foundation is buried below ground (8) level, minimising the visual impact. However, at sites where the visual impact is not as important, it is possible to assemble the beams (2a, 2b, 2c) alternatively with the sections of greater height oriented upward, as shown in FIGS. 8 and 9, emerging from ground (8) level together with part of the concrete ballast filling (5) or the precast concrete elements (10), together with the entire corresponding upper slab (6,11).

This foundation for wind turbine towers presented requires a specific construction method, that comprises
  a first phase of preparing the terrain,
  a second phase of concreting the footings (1),
  a third phase of the curing of the footings (1),
  a fourth phase of assembling the precast beams (2a, 2b),
  a fifth phase of carrying out the connection of the beams (2a, 2b) at the central part, and
  a sixth phase of filling the remaining space to the original ground (8) level.

The first phase of preparing of the terrain includes the excavation of troughs for the footings (1), of trenches between them to house the beams (2a, 2b), and of the central trough for the connection of the beams (2a, 2b) and for the concrete ballast filling (5) or precast concrete elements (10), as the case may be.

The second phase of concreting the footings (1) includes a step of preparing the formwork, a step of fitting the metal reinforcement, a step of fitting the support ball joint (3) and the anchors (4) and a step of pouring the concrete.

The third phase of the curing of the footings (1) will be carried out for a period of time appropriate for the shape and volume of concrete used.

The fourth phase of assembling the precast beams (2a, 2b) comprises a step of placing the beams, by means of a crane, in their trench with their outer ends on the support ball joint (3), a step of solidly securing the inner ends of the beams (2a, 2b) together, or the inner ends of the beam (2b) with the middle part of the beam 2a if this is double length, by means of conventional techniques of connecting precast concrete elements, and a step of solidly securing the outer ends with the footings (1) by means of the anchors (4).

In the case that the wind turbine tower is metal, the fifth phase of connecting the beams (2a, 2b) at the central part includes a step of carrying out the concrete ballast filling (5), and a step of carrying out the upper slab (6) over the connection of the beams (2a, 2b).

In the case that the wind turbine tower is concrete at its lower part, the fifth phase of connecting the beams (2a, 2b) at the central part, comprises a step of assembling the precast concrete elements (10) in the openings remaining between the beams (2a, 2b, 2c) at the central part, by means of conventional techniques of connecting precast concrete elements, defining a hollow tensioning chamber (9), and a step of carrying out the upper slab (11) over the connection the beams (2a, 2b).

A person skilled in the art will easily comprehend that the characteristics of different embodiments can be combined with the characteristics of other possible embodiments, provided that the combination is technically possible.

All of the information referring to examples or embodiments form part of the description of the invention.

The invention claimed is:
1. A foundation for wind turbine towers, comprising:
   at least three precast beams (2a, 2b, 2c) arranged horizontally in a radial manner,
   each of the at least three precast beams having an outermost end supported on an associated concrete footing (1) by means of an associated support ball joint (3) in a central part of the said footing (1), each of the at least three precast beams also secured by means of a plurality of anchors (4) between the outermost end thereof and the associated concrete footing (1), and wherein the at least three precast beams are solidly secured together at a central part of the foundation by a connecting means.

2. The foundation for wind turbine towers, according to claim 1, wherein a first of the at least three precast beams is approximately twice a length of two other of the at least three precast beams, wherein inner ends of the two other of the at least three precast beams are solidly secured to a central part of the first of the at least three precast beams so that a cross-shaped plan structure is formed.

3. The foundation for wind turbine towers, according to claim 1, wherein the connection means comprises threaded rods, brackets, tongue-and-groove joints, and/or post-tensioning strands.

4. The foundation for wind turbine towers, according to claim 1, wherein the wind turbine tower is metal, wherein the connection means comprises a concrete ballast filling (5) located below a level of ground (8) at a position where the at least three precast beams are solidly secured together, and further comprising an upper slab (6) emerging above the level of ground (8) over the concrete ballast filling for the anchoring of a metal tower (7).

5. The foundation for wind turbine towers, according to claim 1, wherein a lower part of the wind turbine tower is concrete, wherein the connection means comprises precast concrete elements (10) defining a hollow tensioning chamber (9) adjacent to a position where the at least three precast beams are solidly secured together, and further comprising an upper slab (11) positioned over the position where the at least three precast beams are solidly secured together and over the hollow tensioning chamber (9), the upper slab providing support of the wind turbine tower (12).

6. A method of construction of a foundation for wind turbine towers such as that described in claim 1, wherein it includes
 a first phase of preparing a terrain,
 a second phase of concreting footings (1),
 a third phase of curing of the footings (1),
 a fourth phase of assembling the at least three precast concrete beams (2a, 2b, 2c), a fifth phase of carrying out connection of the at least three beams (2a, 2b, 2c) at the central part of the foundation, and
 a sixth phase of filling a remaining space to an original ground (8) level.

7. The method of construction of a foundation for wind turbine towers, according to claim 6, wherein the first phase of preparing the terrain includes excavation of troughs for the footings (1), of trenches between each of the footings to house the at least three beams (2a, 2b, 2c), and of a central trough for the connection of the at least three beams (2a, 2b, 2c) and for a concrete ballast filling (5) or precast concrete elements (10).

8. The method of construction of a foundation for wind turbine towers, according to claim 6, wherein the phase of concreting the footings (1) includes a step of preparing formwork, a step of fitting metal reinforcement, a step of fitting each of the support ball joints (3) and the plurality of anchors (4) and a step of pouring concrete.

9. The method of construction of a foundation for wind turbine towers, according to claim 6, wherein the fourth phase of assembling the at least three precast concrete beams (2a, 2b, 2c) includes a step of placing the at least three beams, by means of a crane, in an associated trench with the outer ends thereof on the associated support ball joint (3), a step of solidly securing the at least three beams (2a, 2b, 2c) together by connecting precast concrete elements, and a step of solidly securing the outermost ends of each of the at least three beams to the associated concrete footing using the plurality of anchors (4).

10. The method of construction of a foundation for wind turbine towers, according to claim 6, wherein the wind turbine tower is metal, wherein the fifth phase of carrying out the connection of the at least three beams (2a, 2b, 2c) at the central part of the foundation includes a step of carrying out concrete ballast filling (5).

11. The method of construction of a foundation for wind turbine towers, according to claim 6, wherein a lower part of the wind turbine tower is made of concrete, wherein the fifth phase of carrying out the connection of the at least three beams (2a, 2b, 2c) at the central part of the foundation includes a step of assembling precast concrete elements (10) in openings between the at least three beams (2a, 2b, 2c) at the central part of the foundation by connecting precast concrete elements defining a hollow tensioning chamber (9).

\* \* \* \* \*